United States Patent [19]
Thomas

[11] Patent Number: 5,885,087
[45] Date of Patent: Mar. 23, 1999

[54] METHOD AND APPARATUS FOR IMPROVING PERFORMANCE ON MULTIPLE-CHOICE EXAMS

[75] Inventor: C. Douglass Thomas, Campbell, Calif.

[73] Assignee: RoboLaw Corporation, Campbell, Calif.

[21] Appl. No.: 810,547

[22] Filed: Mar. 3, 1997

Related U.S. Application Data

[63] Continuation of Ser. No. 315,976, Sep. 30, 1994, Pat. No. 5,618,182.

[51] Int. Cl.$^6$ ...................................................... G09B 7/00
[52] U.S. Cl. ........................ 434/373; 434/118; 434/322; 434/362; 702/182; 706/927
[58] Field of Search ..................................... 434/118, 156, 434/169, 201, 307 R, 322, 323, 327, 335, 350, 353, 362, 359; 273/429–432; 707/500, 1; 706/927; 702/182

[56] References Cited

U.S. PATENT DOCUMENTS

| | | |
|---|---|---|
| 3,546,791 | 12/1970 | Koos et al. .............................. 434/323 |
| 4,798,543 | 1/1989 | Spiece . |
| 4,867,685 | 9/1989 | Brush et al. . |
| 5,002,491 | 3/1991 | Abrahamson et al. . |
| 5,018,082 | 5/1991 | Obata et al. . |
| 5,033,969 | 7/1991 | Kamimura . |
| 5,035,625 | 7/1991 | Munson et al. . |
| 5,178,545 | 1/1993 | Thompson . |
| 5,204,813 | 4/1993 | Samph et al. . |
| 5,211,563 | 5/1993 | Haga et al. . |
| 5,218,537 | 6/1993 | Hemphill et al. . |
| 5,228,859 | 7/1993 | Rowe . |
| 5,257,185 | 10/1993 | Farley et al. . |
| 5,267,865 | 12/1993 | Lee et al. . |
| 5,302,132 | 4/1994 | Corder . |
| 5,306,154 | 4/1994 | Ujita et al. . |
| 5,310,349 | 5/1994 | Daniels et al. . |
| 5,316,485 | 5/1994 | Hirose . |
| 5,421,730 | 6/1995 | Lasker, III et al. . |
| 5,618,182 | 4/1997 | Thomas .............................. 434/118 X |

OTHER PUBLICATIONS

The SMH Personal Tutor (Product Brochure), SMH Bar Review, printed in National Jurist Feb./Mar. 1994.

The Law in a Flash Study Series (Product Catelog), Professional Flash Cards, Ltd., 1993 (TestMaster Computer Software).

SmartStudy software program, BAR/BRI Multistate Testing: Bar Review, by Engineering Associates and Harcourt Brace Legal & Professional Publications, Inc., 1993, 16 pages.

Primary Examiner—Joe H. Cheng

[57] ABSTRACT

A computerized learning approach that enables a user to improve their performance on multiple-choice exams is disclosed. Although the learning approach includes various aspects and implementations, in general, the invention forces test-takers to practice their examination skills and subject matter knowledge in a systematic way. The systematic way forces the users to follow a proven problem-solving approach designed to improve their performance. The invention provides important performance feedback to user's, for example, elapsed time per question and percentage of correctly answered questions. The invention can also pinpoint for the user the substantive areas of the exam which the user is either weak or strong. Further, the invention is able to assist the user in predicting his/her eventual score.

48 Claims, 10 Drawing Sheets

METHOD AND APPARATUS FOR IMPROVING PERFORMANCE ON MULTIPLE-CHOICE EXAMS

This is a Continuation application of application Ser. No. 08/315,976, filed Sept. 30, 1994, now U.S. Pat. No. 5,618,182, and the disclosure of which is hereby incorporated by reference.

BACKGROUND OF THE INVENTION

1. Field of the Invention

The present invention relates to a computerized learning approach, and more particularly, to a method and apparatus for improving performance on multiple-choice exams.

2. Description of the Related Art

Multiple-choice examinations are very common today. These examinations typically test a set of predetermined subject areas and are usually time limited. One's performance on these exams is very important.

The Multistate Bar Examination (MBE) is a particular multiple-choice exam for which this invention was developed. The MBE is a rigorous multiple-choice examination which tests six substantive areas of law in a time limited manner. The MBE forms a significant portion of the bar examination for most of the states in the United States. The ability of the test-takers to achieve a passing score on this portion of the bar examination is critical. It is the difference between being able to practice law in a particular state, and not. Consequently, those who desire to pass the bar examination spend a great deal of time studying for the MBE.

Known study approaches make use of written materials and rely on a user's discipline and drive to keep them working. Several bar review courses provide potential examinees with workbooks which provide several hundred practice questions that the user can work through as he/she sees fit. At the back of these workbooks are contained answers and explanations for the questions.

A major problem with these known and traditional approaches is that they do not, and cannot, force the user to study in a consistent, systematic and effective way. As a result, users typically study in a haphazard way which varies with their mood, desire and drive. The danger with these conventional approaches is that user's tend not to develop a consistent problem-solving approach, but instead develop and utilize inefficient and undesirable study habits. Another serious problem is that users also tend not to fully understand a question, and why one answer choice is correct, while the other answer choices are incorrect.

Thus, there is a need for a system which offers greater efficiency and effectiveness by requiring the user to study in a consistent and systematic way.

SUMMARY OF THE INVENTION

Broadly speaking, the invention relates to a computerized learning approach that enables a user to improve performance on multiple-choice exams.

A first aspect of the invention concerns a computerized learning method which forces a user to continue attempting to answer a question until the user has selected the correct answer choice. This aspect can be implemented by a computerized learning method which displays a question and a plurality of answer choices on a display screen, awaits the user's selection of one of the answer choices, compares the selected answer choice with a predetermined correct answer choice for the question, and subsequently awaits selection of another one of the answer choices when the selected answer choice is not the correct answer choice. Alternatively, the method can force the user to indicate whether each of the answer choices are correct or incorrect.

Another aspect of the invention concerns a computerized learning method which displays an elapsed time for the user to select an answer choice for the question. This enables the user to monitor and evaluate his/her time performance on practice questions for the multiple choice exam. This aspect of the invention can be implemented by a computerized learning method which displays a question and a plurality of answer choices on a display screen, enables a timer to monitor a time duration for the user to answer the question, awaits selection of one of the answer choices by the user, displays a visual indication of the time duration, stops the time duration timer when one of the answer choices is selected, and determines whether the selected answer choice is the correct answer choice for the question. Further, a visual indication of a predetermined time may be displayed together with the visual indication of the time duration.

Yet another aspect of the invention provides the user with assistance so that the user can better understand the question to be answered or the knowledge needed to answer the question. This aspect can be implemented in one or a combination of the following ways. Typically, however, this aspect is invoked only when the answer choice selected by the user is not the correct answer choice. A first implementation provides the user with a hint towards the correct answer choice. A second implementation displays, for the user, substantive information relevant to answering the question. A third implementation displays an explanation of the correct answer choice once the user has selected the correct answer choice.

Still another aspect of the invention concerns a computerized learning method which provides detailed performance information to the user. For example, the invention can plot the time duration for each question or set of questions to produce a graph on a display screen. The graph may also include a visual indication of a predetermined time duration. Another example is that the invention can plot the percentage of correctness to produce a graph on the display screen. Here, the graph may also indicate a visual indication of a target percentage. The can also predict the user's future performance using the thus far obtained performance data on the user.

The invention can also be implemented as an apparatus to improve a user's performance on multiple-choice exams. The apparatus includes a computer having a display screen associated therewith, and a computer program executed by the computer. The computer program includes at least means for displaying a question and a plurality of answer choices on the display screen, means for awaiting selection of one of the answer choices by the user, means for determining whether the selected answer choice is the correct answer choice for the question, and means for awaiting selection of another one of the answer choices when the selected answer choice is not the correct answer choice.

Another apparatus implementing the invention concerns a computer diskette. The computer diskette includes practice questions for a multiple-choice exam, correct answers for the practice questions, and a stored computer program for improving performance on the multiple-choice exam. When the computer program is executed by a computer, the program operates to carry out any aspects of the methods discussed above. The computer diskette can also include hints for each of the practice questions, specific topic identifiers for each of the questions; and a substantive outline containing detailed information on at least one area of knowledge being tested by the multiple-choice exam.

The invention forces test-takers to practice their examination skills and subject matter knowledge in a systematic way. The systematic way forces the users to follow a proven problem-solving approach designed to improve their performance. Additionally, the invention provides important performance feedback to user's, for example, elapsed time per question and percentage of correctly answered questions. The invention can also pinpoint for the user the substantive areas of the exam which the user is either weak or strong. Further, the invention is able to assist the user in predicting his/her eventual score.

The various aspects of the invention discussed above may also be combined in various ways to produce additional implementations of the invention. In addition, other aspects and advantages of the invention will become apparent from the following detailed description, taken in conjunction with the accompanying drawings, illustrating by way of example the principals of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF THE INVENTION

Embodiments of the invention are discussed below with reference to FIGS. 1–7. However, those skilled in the art will readily appreciate that the detailed description given herein with respect to these figures is for explanatory purposes as the invention extends beyond these limited embodiments.

Figure 1:
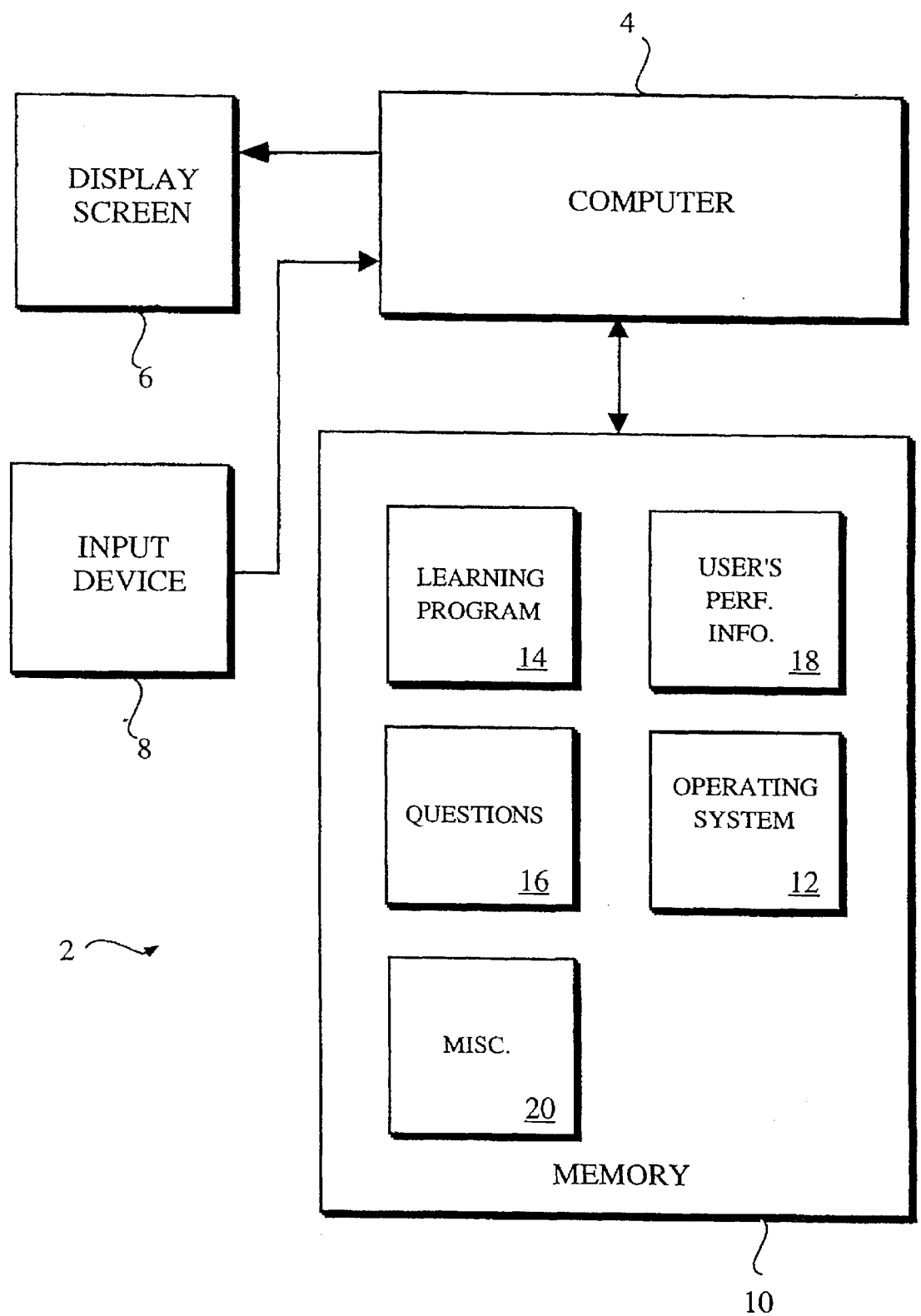
FIG. 1 is a block diagram of an embodiment of an apparatus according to the invention.

FIG. 1 is a block diagram of an embodiment of an apparatus according to the invention. The apparatus 2 includes a computer 4, a display screen 6, an input device 8, and a memory 10. The memory 10 provides storage for an operating system 12, a learning program 14, practice questions 16, user's performance information 18, and miscellaneous information 20.

The computer 4 is preferably a microcomputer, such as a desktop or notebook computer. However, the computer 4 could also be a larger computer such as a workstation or mainframe computer. The computer 4 could also be remotely located from the user who would interact with the a computer over a network.

The memory 10 is connected to the computer 4. The memory 10 can consist of one or more of various types of data storage devices, including semiconductor, diskette and tape. In any case, the memory 10 stores information in one or more of the various types of data storage devices. The computer 4 of the apparatus 2 implements the invention by executing the learning program 14. While executing the learning program 14, the computer 4 retrieves the practice questions 16 from the memory 10 and displays them to the user on the display screen 6. The user then uses the input device 8 to select an answer choice for the question being displayed. When the learning program 14 is executed by the computer 4, a learning method according to the invention is carried out. The details of various learning methods associated with the learning program 14 are described in detail below in FIGS. 2A, 2B, 3, 4, 6, 7A and 7B.

The learning method according to the invention will cause performance information 18 and miscellaneous information 20 to be produced. The performance information 18 may, for example, include a correct/incorrect indicator and an elapsed time for each question or set of questions. The performance information 18 may also include a subject and a topic for each question. The miscellaneous information 20 can include any additional data storage as needed by the computer 4, e.g., various flags and other values which indicate options selected by the user or indicate user's state of progress. The user's performance information 18 and miscellaneous information 20 are stored to, or retrieved, from the memory 10 as needed by the computer 4. The operating system 12 is used by the computer 4 to control basic computer operations. Examples of operating systems include Windows, DOS, OS/2 and UNIX.

Figure 2A:
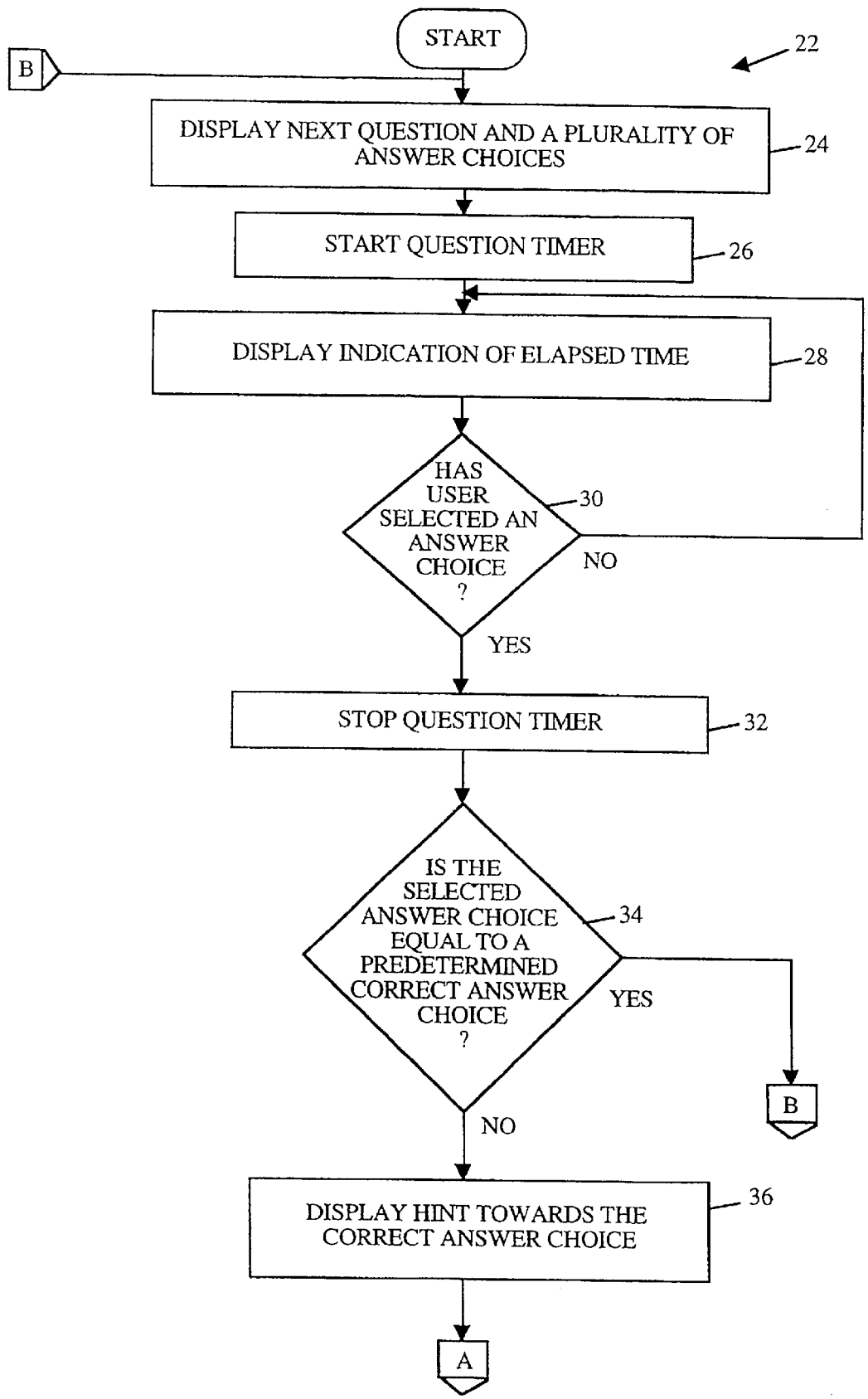
FIGS. 2A and 2B are block diagrams of a first embodiment of a learning method according to the invention.
Figure 2B:
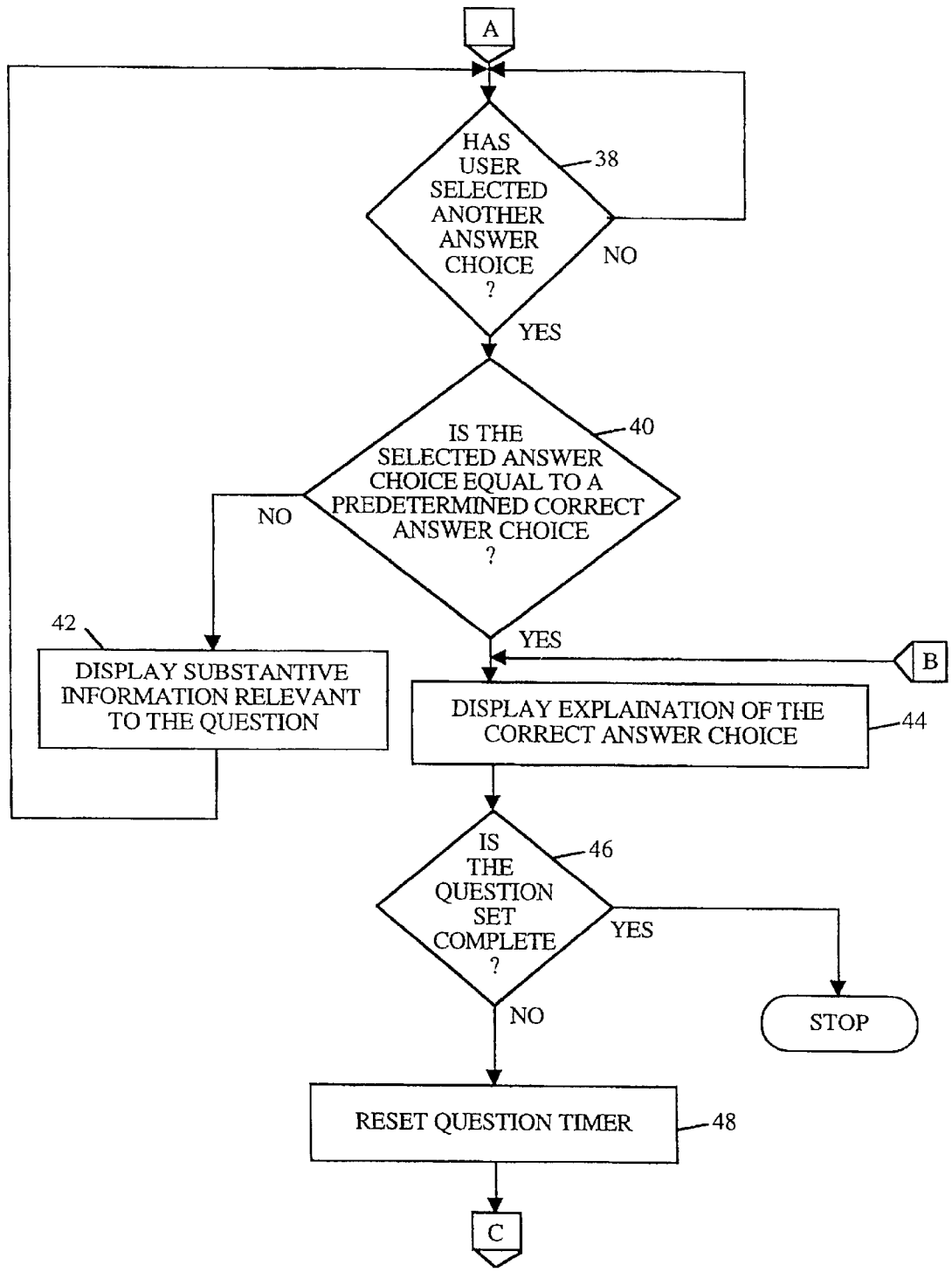

FIGS. 2A and 2B are block diagrams of a first embodiment of a learning method according to the invention. The learning method 22 begins by displaying 24 a question and a plurality of answer choices to a user. For example, the question and its answer choices can be retrieved from the various practice questions 16 stored in the memory 10 and then displayed on the display screen 6. Preferably, the question and its answer choices are very similar to the questions and answers which actually appear on the MBE. It is also preferable that the questions and answers be displayed in a format and font which are very close to those used in the MBE. The closer the appearance and the format of the question and its answer to that of the MBE, the more comfortable the user will be on the actual MBE exam.

Once the question and its answer choices are displayed 24, a question timer is started 26. The question timer operates to keep track of the amount of time elapsed from the time the question was displayed until the user selects an answer choice. Due to the fact that the MBE is a severely time limited exam, keeping track of the users time performance for each question is very important. As the question timer monitors the elapsed time, a visual indication of the elapsed time is displayed 28. For example, a digital stopwatch, a bar graph, or some other graphical technique could be displayed 28 on the display screen 6 to provide a visual indication of the elapsed time to the user. By displaying 28 a visual indication of the elapsed time, the user becomes sensitized to the amount of time he/she spends to answer questions and how he/she is doing time-wise with respect to a predetermined duration of time. Alternatively, an audio signal could be used with reduced effectiveness. The visual indication of the elapsed time is far superior to an audio signal because the user is able to see the elapsed time as he/she attempts to determine the correct answer choice for the question.

Next, a decision 30 is made based on whether the user has selected an answer choice for the question. If the user has not yet selected an answer choice, the learning method 22 awaits the user's selection while periodically updating the visual indication of the elapsed time being displayed 28. Once the user has selected an answer choice for the question, the question timer is stopped 32. The question timer is stopped at this time so that only the time for the user to select his/her first answer choice is measured A decision 34 is then made based on a comparison of the selected answer choice and a predetermined answer choice for the question. If the selected answer choice is not the correct answer choice (that is, the selected answer choice does not equal the predetermined answer choice), then the learning method 22 forces the user to keep working on the question. Initially, the leaning method 22 displays 36 a hint towards the correct answer choice. For example, a hint for the particular question could be retrieved from the memory 10 and displayed on the display screen 6 for the user. The hint might identify the issue or state the appropriate rule of law for the question. Next, the learning program 22 again awaits the user's selection 38 of another answer choice. Preferably, the learning method 22 prevents the user from selecting an answer choice he/she already incorrectly selected.

Once the user selects 38 another answer choice, a decision 40 is made based on a comparison of the selected answer choice and the predetermined answer choice for the question. If the selected answer choice is still not the correct answer choice, then the learning method 22 again forces the user to keep working on the question. However, for the next go around, the learning method 22 may provide additional assistance to the user by displaying 42 (or provide the option of displaying) substantive information relevant to the question. For example, the substantive information could be a portion of a substantive outline of a subject of the MBE. The portion would be the portion of the outline which discussed the rules of law the user needs to understand and correctly answer the question.

In any case, once the user selects the correct answer choice (after block 34 or 40), an explanation of the correct answer choice is displayed 44. By displaying such information to the user, the user is encouraged to verify that his/her reasoning for choosing the correct answer choice was correct, or if his/her reasoning was incorrect, to help the user understand the proper approach to the question.

Next, a decision 46 is made based on whether a question set is complete. Although not previously mentioned, the questions are preferably presented to the user in sets of questions. Preferably, a set could include about fifteen questions. The user is required to work through at least one entire question set in a single sitting. This forces the user to concentrate on the questions and the problem-solving approach for a reasonable period of time (typically 30–60 minutes), even if the user works through a single set. Using sets of questions also helps to balance users' performance parameters over the set. Users' performance parameters tend to be fairly consistent over a reasonable sized set, whereas question by question the parameters tend to have large variations. In this regard, if the question set is not yet complete, the learning method 22 will reset the question timer 48 and return to the beginning of the method 22 to display a next question of the question set. On the other hand, once the question set is complete, the learning method 22 is completed, at least for the given question set.

Figure 3:
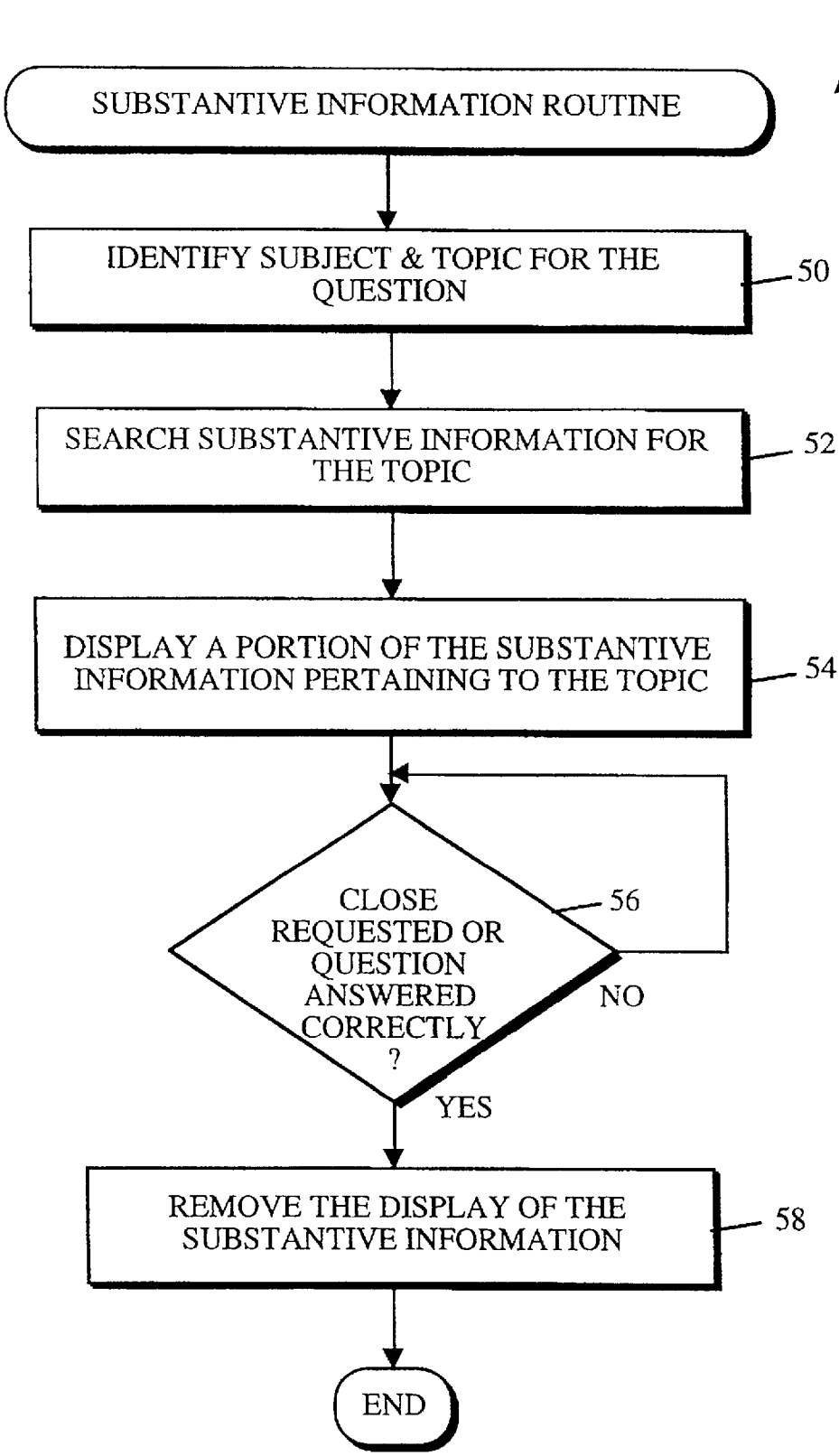
FIG. 3 is a block diagram of a substantive information routine according to the invention.

FIG. 3 is a block diagram of a substantive information routine according to the invention. The substantive routine 49 is performed by the computer 4 to display 42 substantive information relevant to the question as shown in FIG. 2B. The substantive routine 49 begins by identifying a subject and topic for the question. The topic is preferably a heading section within a substantive legal outline for a particular subject of the MBE. For example, the substantive information for a question concerning contract law might have topics such as assignment, statue of fraud, acceptance, etc.

After the subject and topic are identified 50 for the question, the computer 4 searches 52 the substantive information for the topic. For example, the contracts legal outline could be searched for the heading "assignment" using known word searching techniques. Alternatively, the searching 52 could be performed by a table look-up into a table containing information on the location of topics within the outline. A portion of the substantive information pertaining to the topic is then displayed 54. For example, the portion could be the information in the contracts legal outline in the section identified by the heading "assignment". Preferably, in a Windows environment, a separate viewing window would be opened to contain the portion of the outline, and the question and answer choices would be displayed concurrently with the outline viewing window. It is also preferable that the displayed substantive information (e.g., portion of legal outline) have the same format and font as the printed outline which the user has available for studying.

A decision 56 is then made based on whether the question has been answered correctly or the user has requested removal of the portion of the outline being displayed. Once the substantive routine 49 determines 56 that the question has been answered correctly or the user has requested removal of the window displaying the portion of the outline, the substantive routine 49 removes 58 the display 54 of the substantive information. Otherwise, the displayed 54 substantive information remains so that the user can read the pertinent portion of the outline and scroll to other sections if so desired.

Figure 4:
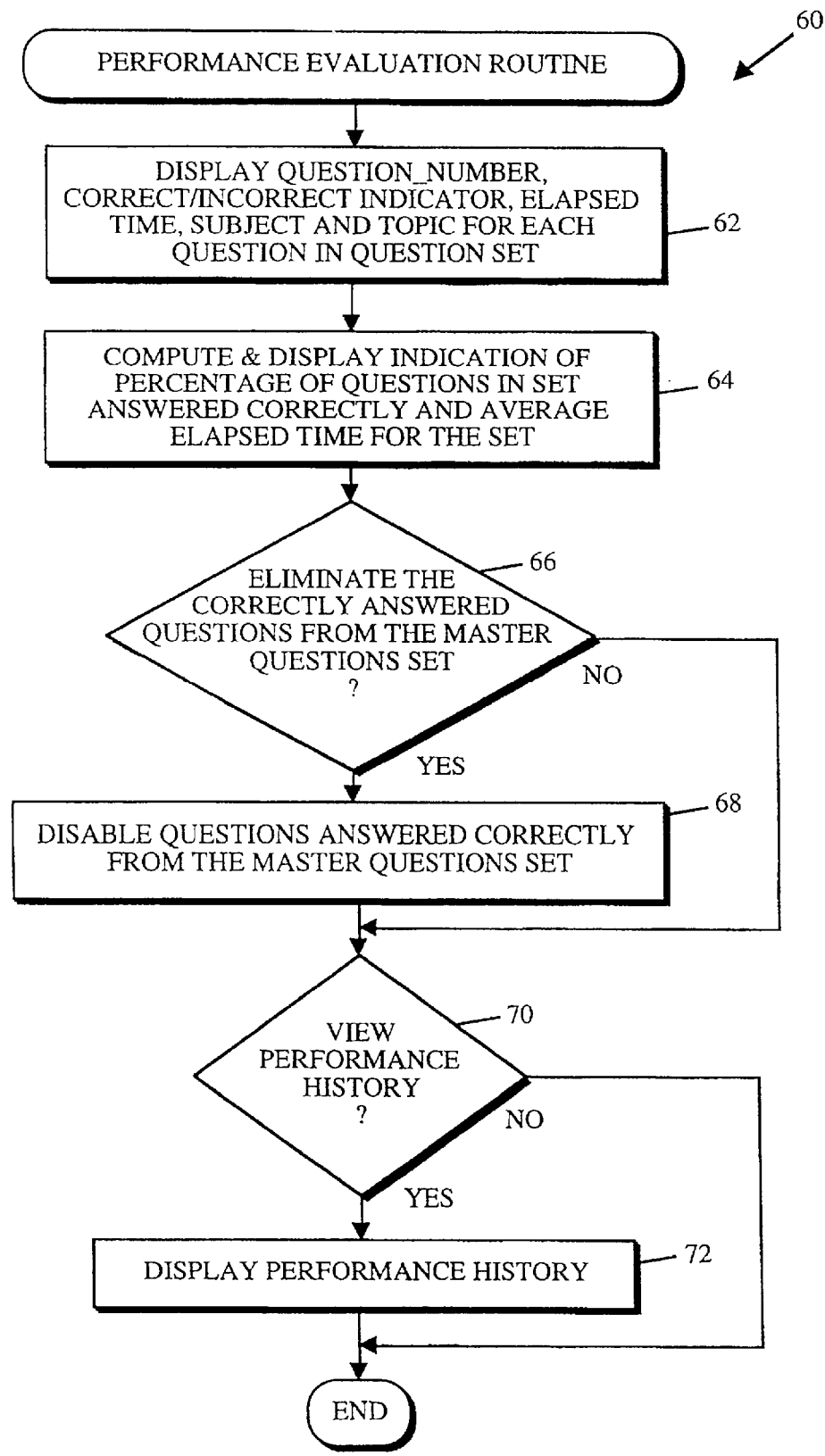
FIG. 4 is a block diagram of a performance evaluation routine according to the invention.

FIG. 4 is a block diagram of a performance evaluation routine according to the invention. As the user works through the learning method 22, performance information 18 is routinely saved by the computer 4 to the memory 10. At the end of a question set, the performance evaluation routine 60 would enable a user to display performance information to the user in a useful way to enable the user to understand his/her performance. Specifically, the performance evaluation routine 60 begins by displaying 62 the question number, elapsed time, a correct/incorrect indicator, and subject and topic categories for each question in the question set. For example, the displayed information might be displayed in a table such as Table 1 below.

TABLE 1

| Question No. | Subject | Topic | Result | Time |
|---|---|---|---|---|
| 1 | Evidence | Hearsay | Correct | 3:21 |
| 2 | Contracts | Assignment | Incorrect | 1:38 |
| 3 | Contracts | Acceptance | Correct | 2:20 |
| . | . | . | . | |
| . | . | . | . | |
| . | . | . | . | |
| 15 | CrimLaw | Battery | Correct | 1:58 |

Next, a percentage of questions in the question set which were answered correctly is computed and displayed 64. For example, if the user answers eight of the fifteen questions correctly, the percentage displayed would be 53.33%. This percentage is useful to the user because the user can directly compare his/her set percentage with the percentage the user eventually desires to achieve on the MBE, which is usually at least 65% and typically between 70 and 75%. An average elapsed time for the user to answer the questions in the question set is also be computed and displayed 64.

A decision 66 is then made based on whether the user desires to eliminate the correctly answered questions from the master questions set. Although this decision may be made mandatory to prevent the user from repeating questions and thereby polluting his/her performance data, the decision 66 is shown here as being the user's choice. If the user desires to eliminate the correctly answered questions from the set, then the questions answered correctly are disabled 68. This disabling 68 can be achieved by setting an enable/disable flag associated with each of the questions. Such flags are located in the memory 10, e.g., with the practice questions 16 or the miscellaneous storage 20. Nevertheless, the questions which have not been answered correctly can be repeated in a review mode, but are preferably not repeated in the practice or study mode, as such would corrupt the user's performance data.

Figure 5A:
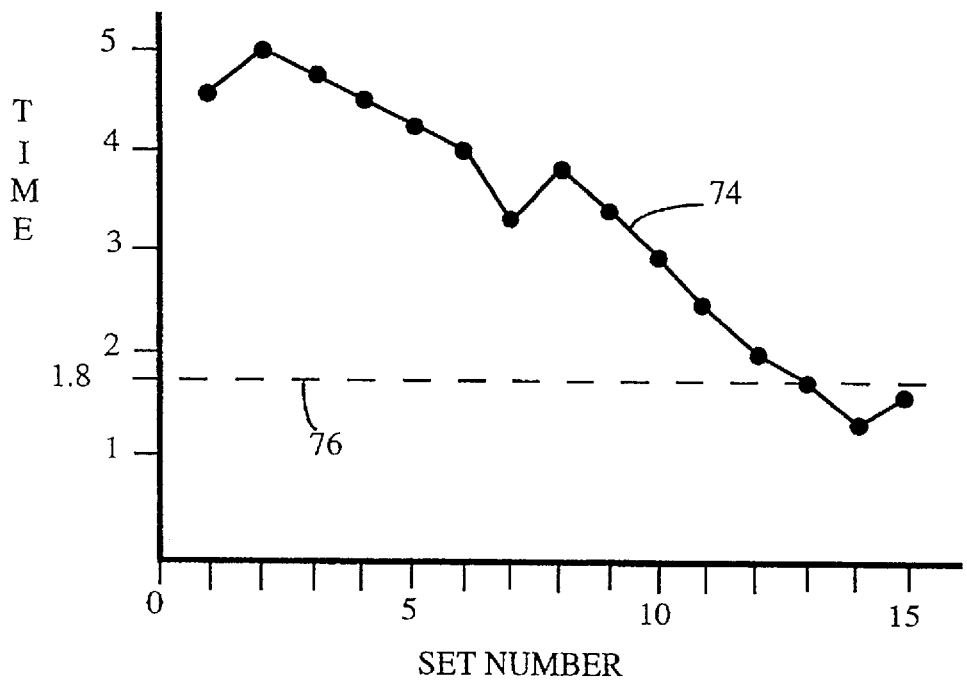
FIGS. 5A, 5B and 5C are graphs illustrating a user's performance.
Figure 5B:
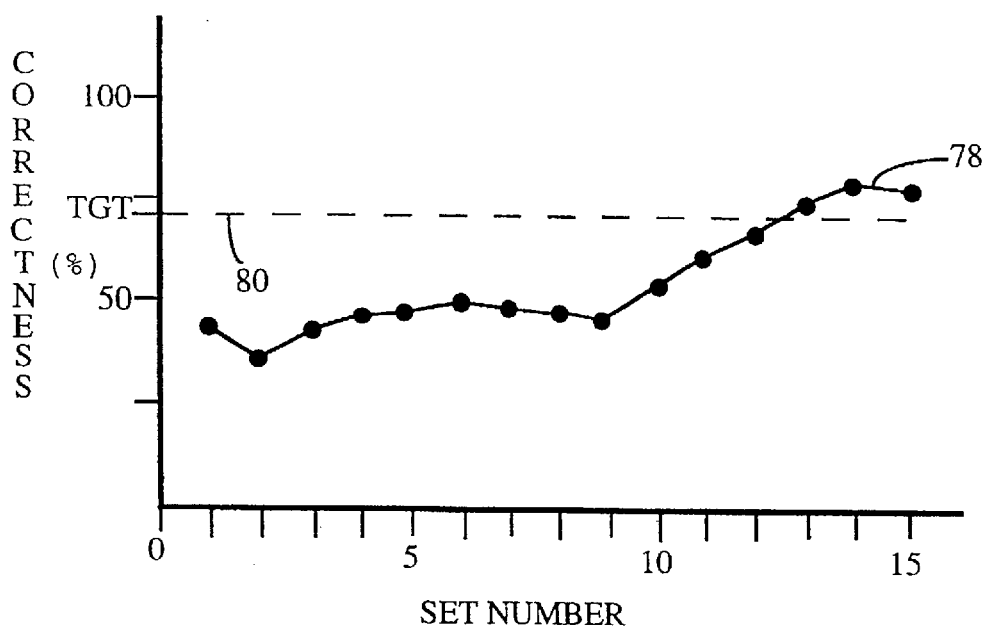

Thereafter, a decision 70 is made based on whether the user desires to view his/her performance history. Here, the computer 4 makes use of the performance data 18 for each question or set of questions to produce elaborate performance feedback to the user. If the user desires to view his/her performance history, the user's performance history is displayed 72. Although the performance data could be displayed in tables, preferably, graphical presentations are made. For example, (i) graphs of users time verses question set or (ii) correctness verses question set can be displayed as shown in FIGS. 5A and 5B, respectfully. FIG. 5A is a graph 74 illustrating average elapsed time per question for a set. A target elapsed time value 76 is also depicted to provide the user with a reference for their desired performance. FIG. 5B is a graph 78 illustrating average correctness (as a percentage) for a set. A target correctness percentage 80 is also depicted to provide a reference for their desired performance. The graphs 74, 78 are produced by plotting the average elapsed time and a percentage of correctness for the question sets the user has completed. The plotted points can be connected together with line segments. Alternatively, bar graphs could be used.

In any case, these graphs 74, 78 allow the user to see just how his/her performance is improving. Namely, the user can see the target values for each performance measure (time, correctness) and how they are fairing and whether their performance is improving, worsening or stable. Although graphs 74, 78 primarily pertain to overall values, similar graphs can also be produced by subject or topic so as to inform the user if certain of the subject areas or topics of the exam are hurting his/her overall performance. In fact, the graphs of several subjects or topics can be simultaneously shown to the user. For example, the average time and average correctness for each of the subjects of the exam could be simultaneously placed on graphs 74, 78 using different colors or other visually distinguishing marks. Such graphs 74, 78 would also inform the user of the user's relative performance by subject or topic.

Figure 5C:
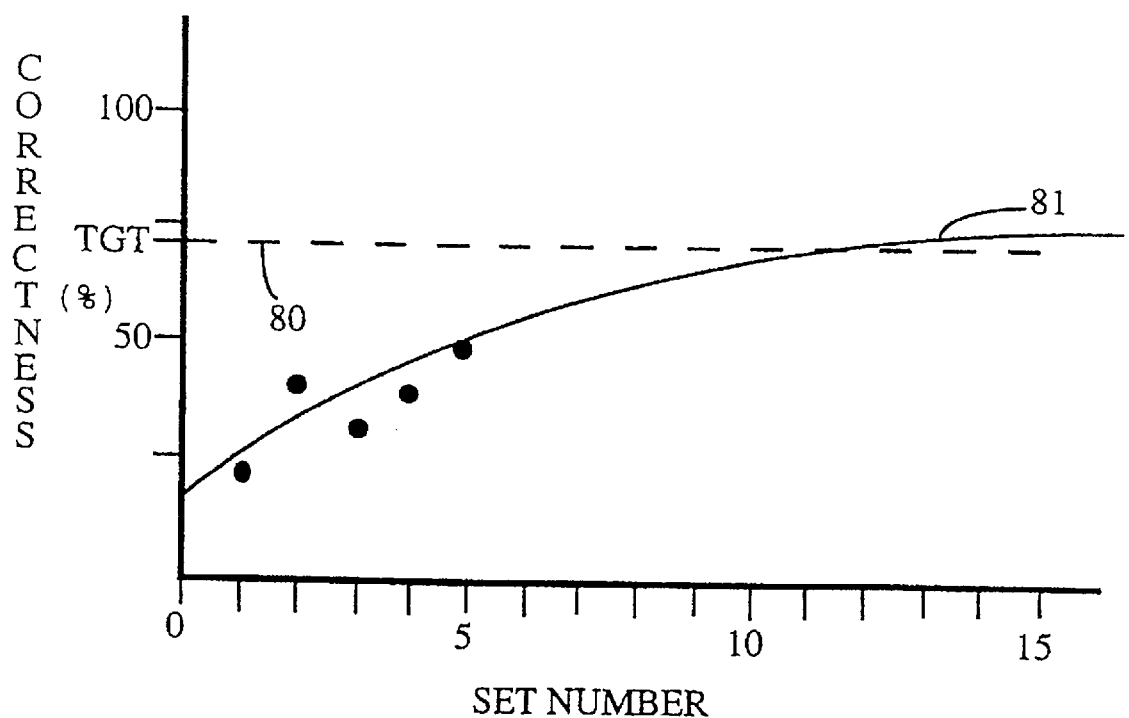

The invention can also be used to predict the user's performance. In particular, the invention can determine and display a user's rate of performance improvement, overall or set to set. This rate would provide the user with some indication as to how his/her performance will improve with future sets. Alternatively, the invention can use the acquired performance data 18 on the user to extrapolate out a general trend of his/her performance to determine if he/she is on track to meet the goals. In this regard, a line or curve of best fit for the user could be computed using known methods and displayed for the user. FIG. 5C is a graph 81 of a curve which uses the user's performance data for sets 1–5 to extrapolate out an estimated future performance of the user. Note that in computing the extrapolated curve it is preferable to use a maximum value for the performance measure. Using a maximum value prevents the extrapolated curve from being overly biased by inconsistent performance data, particularly when only a few set of questions have been answered, The maximum values are statistical approximations of users' maximum performance values, preferably about 75% for correctness and about 1.5 minutes for elapsed time. From the graph 81 in FIG. 5C, the user will understand that based on his/her performance so far that to meet the target correctness percentage 80 at least 11 sets will need to be completed.

Figure 6:
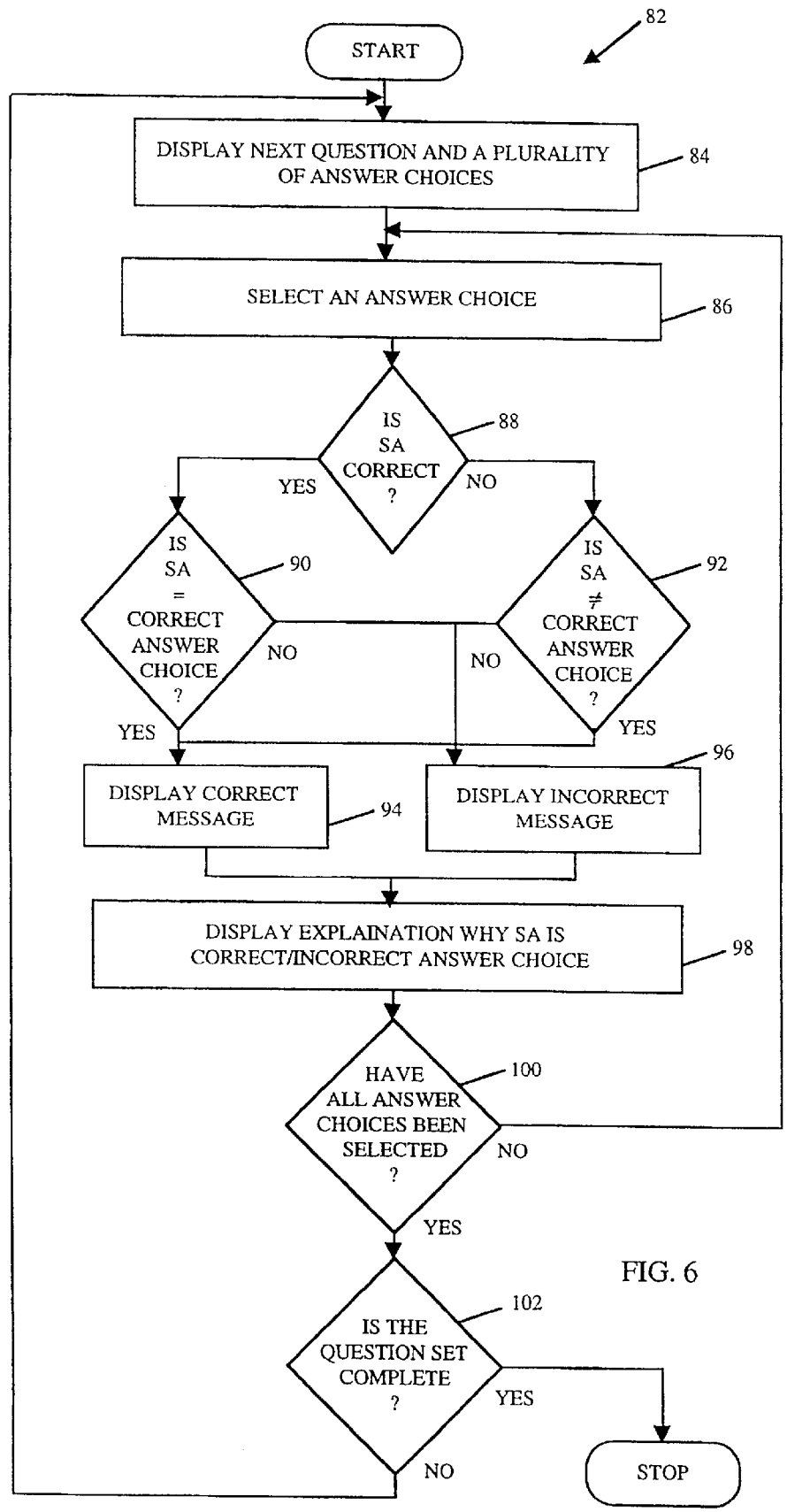
FIG. 6 is a block diagram of a second embodiment of a learning method according to the invention.

FIG. 6 is a block diagram of a second embodiment of a learning method according to the invention. The learning method 82 in this embodiment forces the user to indicate whether each of the answer choices is correct or incorrect. By forcing the user to consider all the answer choices, the learning method makes the user practice the problem-solving approach employed by most exam takers, namely to make an educated guess at the correct answer after eliminating answer choices known to be incorrect.

In any case, the learning method 82 begins by displaying a question and a plurality of answer choices. Next, the user chooses 86 one of the answer choices. The learning method 82 then asks the user to indicate 88 whether the chosen answer choice is the correct answer choice. Note, here the user can select any of the answer choices, not just the correct answer choice, and thereafter, indicate whether it is correct or incorrect.

If the user indicates that the selected answer choice is a correct answer, a decision 90 is made based on whether the selected answer choice is the correct answer choice. On the other hand, if the user indicates that the selected answer choice is an incorrect answer, a decision 92 is made based on whether the selected answer choice is not the correct answer choice.

When either decision 90, 92 is answered in the affirmative, then a correct message is displayed 94 to the user. Alternatively, when either decision 90, 92 is answered in the negative, then an incorrect message is displayed 96 to the user. Following either block 94 or block 96, the learning method 82 displays 98 an explanation indicating why the selected answer choice is the correct/incorrect answer choice, thereby allowing the user to confirm the reasoning or analysis behind his/her answer choice.

Figure 7A:
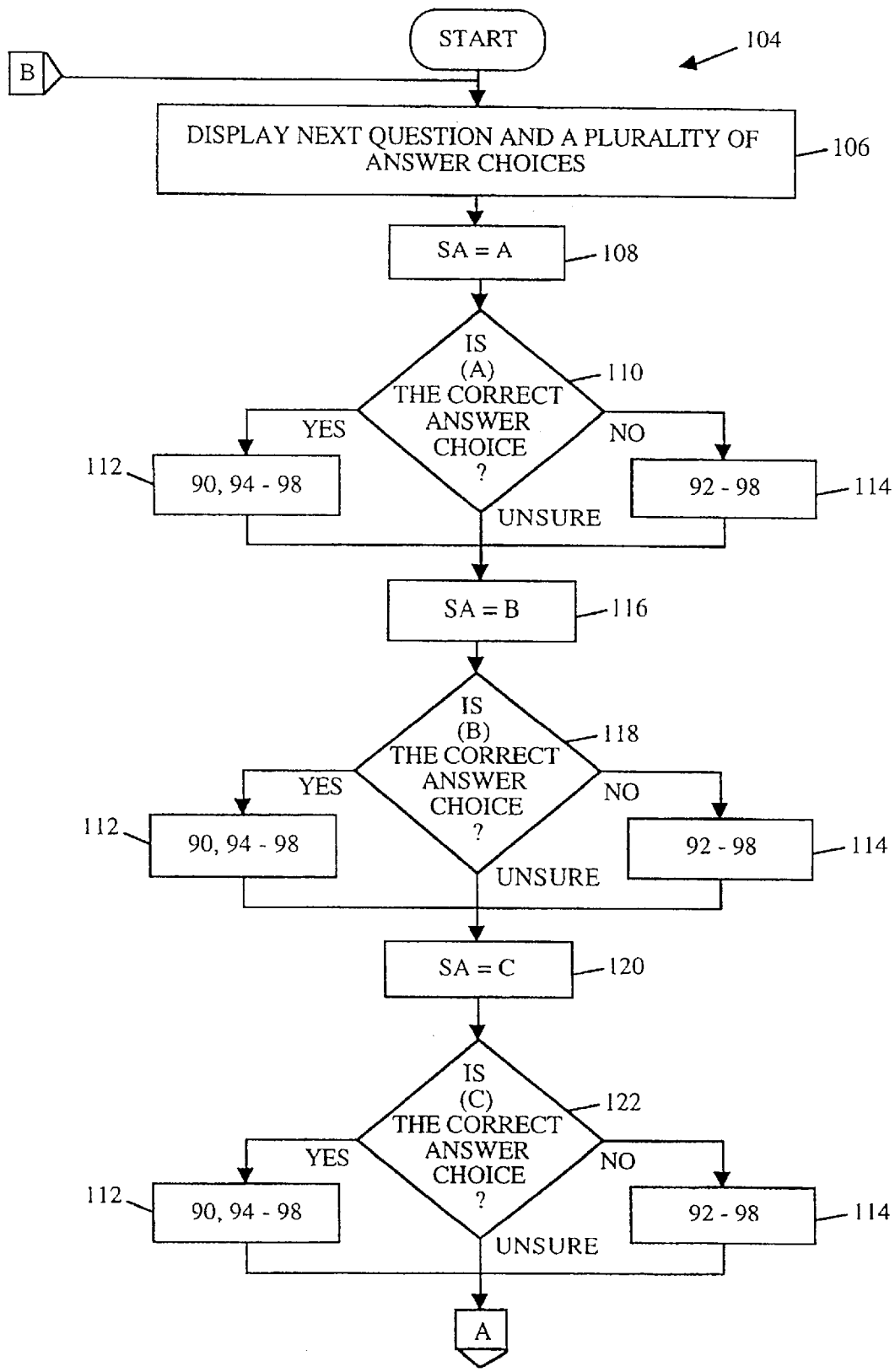
FIGS. 7A and 7B are block diagrams of a third embodiment of a learning method according to the invention.
Figure 7B:
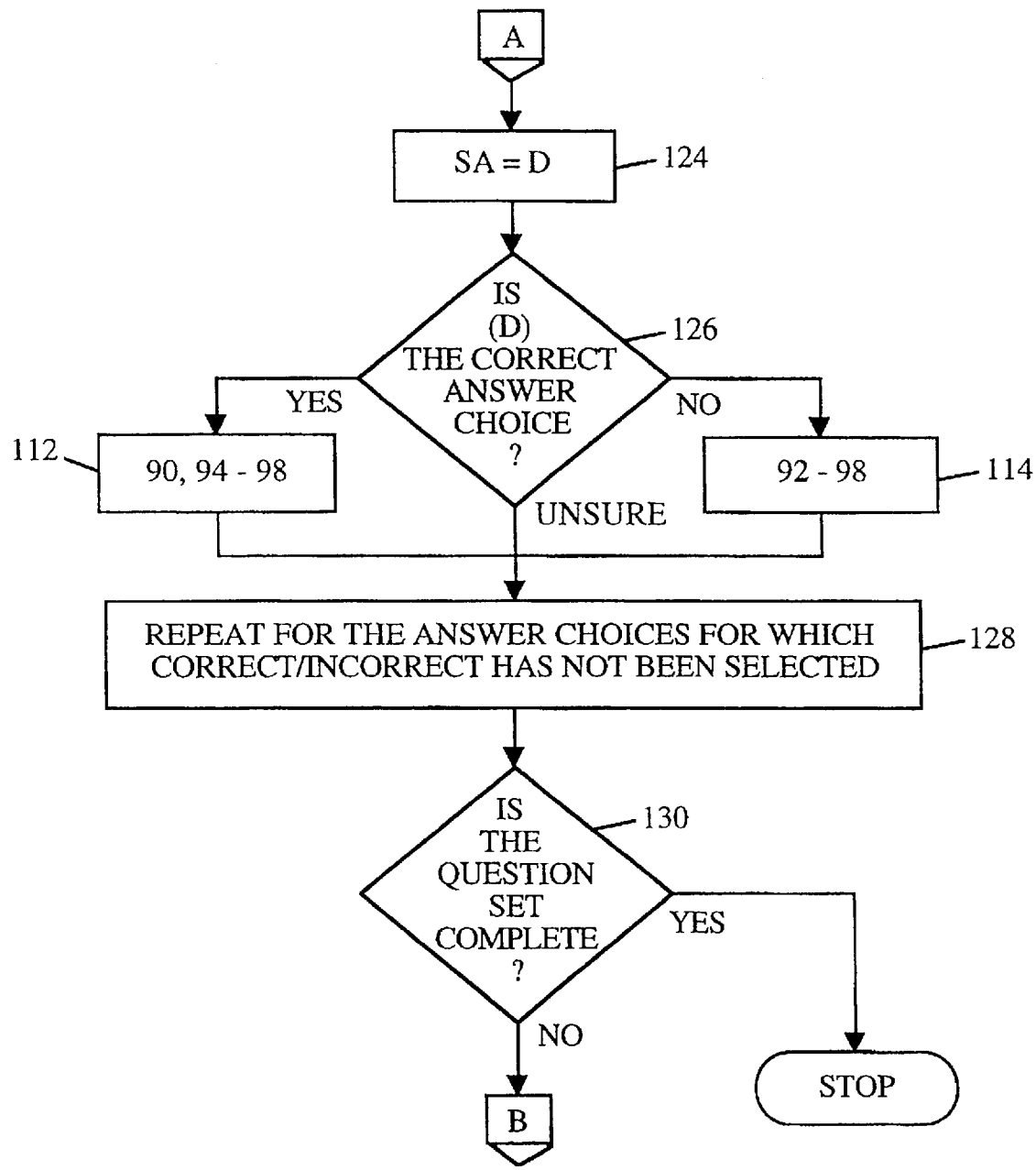

Thereafter, a decision 100 is made based on whether all the answer choices have been selected by the user. If not, blocks 86–98 of the learning method 82 are repeated until all the answer choices have been selected, thereby forcing the user to indicate whether each of the multiple answer choices is either correct or incorrect. Once all the answer choices have been selected, a decision 102 is made based on whether the question set is complete. If the question set is not yet completed, then the learning method 82 returns to block 84 where the next question and answer choices are displayed for a user according to the learning method 82. On the other hand, if the question set is complete, then the learning method 82 is completed FIGS. 7A and 7B are block diagrams of a third embodiment of a learning method according to the invention. In this embodiment, the learning method 104 sequences through the answer choices prompting the user to indicate whether he/she believes the answer choice to be correct or incorrect. The user can also answer "unsure" if the user cannot make an educated guess at the present time.

The learning method 104 begins by displaying 106 a question and a plurality of answer choices to the user. Next, a selected answer (SA) is set 108 to "A", indicating a first answer choice. The learning method 104 then prompts the user to decide 110 whether SA is the correct answer choice. If the user answers in the affirmative, then block 112 is performed. Block 112 represents blocks 90 and 94–98 shown in FIG. 6. On the other hand, if the user answers negatively, then block 114 is performed. Block 114 represents blocks 92–98 shown in FIG. 6. A third option is also available to the user. If the user is unsure as to whether or not SA is the correct answer choice, the user can skip the answer choice.

Thereafter, the learning method 104 performs similar processing for the remaining answer choices. Namely, the selected answer (SA) is set 116, 120, 124 to the other answer choices and the user is prompted for a decision 118, 122, 126 just as was done for the first answer choice. Blocks 112, 114 are also used in the same manner for each of the answer choices.

Once all the answer choices have been processed (answered or skipped), then the same process repeats 128 for the answer choices which the user may have skipped. The process repeats 128 until the user indicates whether each answer choice is correct or incorrect. Hence, skipping answer choices simply delays the decision because the learning method will prompt the user for an answer. After all the answer choices have been indicated as being correct or incorrect, a decision 130 is made based on whether the question set is complete. If the question set is not yet complete, the learning method 104 returns to block 106 to process the next question in the same manner. When the question set is eventually completed, the learning method 104 is completed.

Although not shown, the second and third embodiments of the learning method (like the first embodiment) can also provide the user with a hint or the option of accessing substantive information to help the user answer the question. Performance information can be displayed at the users option.

The above-described embodiments of the learning method can also be combined. A first stage could be designed to focus on the fundamentals of the proven problem-solving approach. Namely, it may be preferable to start the user in either the second or third embodiments of the learning method because these embodiments stress the basic problem approach. Hence, the second and third embodiments force the user to learn and follow the desired problem-solving approach. The basic problem-solving approach is to read the question, then while reading the answer choices, discarding those answer choices deemed clearly wrong. Thereafter, the remaining answer choices are re-read, and the best answer choice is selected. The question or portions thereof can be re-read as needed.

A second stage could be designed as a practice mode. Here, since the user would have already become comfortable with the basic problem-solving approach, the first embodiment of the learning method would be used. The first embodiment is particularly useful because it operates similar to actual exam conditions and offers important performance feedback.

Moreover, within the second stage, various levels of study could be possible. In a first level, all the questions in a set can be for the same subject. This allows the user to concentrate on questions of the same subject. This is beneficial because it frees the user from having to decide which subject category the question pertains to and because the user can concentrate on learning the detailed rules pertaining to the subject. Thereafter, in a second level, the questions in a set can be from various subjects. Although the second level would be more difficult than the first level, it would more closely represent the actual exam.

A third level may also be provided. In the third level, the question in a set would again be from mixed subjects but would be more difficult questions than those in the second level. This level would serve as advanced level studying for the user.

A fourth level may be provided to permit a user to focus on a specific topic which he/she wishes to study in depth. For example, if the performance information indicates that the user is struggling with assignments (topic) in contracts (subject), then the fourth level can be used to practice on question pertaining to assignments. A fifth level may be provided to allow the user to repeat questions he/she previously answered incorrectly.

A third stage could be designed as an exam practice mode. In this stage the user would actually take practice exams under exam-like conditions. The computer system would provide the user with questions, record the user answers, and time the exam.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computerized learning method useful for improving a user's performance on multiple-choice tests, said method comprising:
   (a) displaying a question and a plurality of answer choices on a display screen associated with a computer;
   (b) enabling a time duration timer to monitor a time duration for the user to answer the question;
   (c) awaiting selection of one of the answer choices by the user;
   (d) displaying a visual indication of the time duration;
   (e) stopping the time duration timer when one of the answer choices is selected; and
   (f) determining whether the selected answer choice is the correct answer choice for the question.

2. A method as recited in claim 1, wherein said method further comprises (g) displaying substantive information relevant to answering the question when requested by the user.

3. A method as recited in claim 2, wherein the question has a specific topic associated therewith, and the substantive information is a portion of an outline which pertains to the specific topic of the question.

4. A method as recited in claim 1, wherein said method further comprises:
   (g) tracking a user's time duration performance and a user's correctness performance over a period of time; and
   (h) predicting the user's future time duration performance and the user's correctness performance based on data obtained from said tracking.

5. A computer readable media containing computer instructions that are useful for improving a user's performance on multiple choice examinations, said computer readable media comprising:

first computer program code for displaying a practice question and a plurality of answer choices to a user;

second computer program code for starting a question timer after the practice question and the answer choices are displayed;

third computer program code for receiving the user's selection of one of the answer choices;

fourth computer program code for determining whether the answer choice selected by the user is the correct answer choice; and fifth computer program code for displaying an explanation of the correct answer choice for the practice question.

6. A computer readable media as recited in claim 5, wherein said computer readable media further comprises:

sixth computer program code for displaying, at a user's request, a portion of an outline that is linked to the particular topic of the practice question that has been presented to the user, the outline containing detailed information on a plurality of topics in at least one subject matter area.

7. A computer readable media as recited in claim 6, wherein said sixth computer program code displays the portion of the outline that is linked to the particular topic of the practice question at the user's request, without first having to display the explanation of the correct answer choice.

8. A computer readable media as recited in claim 6, wherein after displaying the portion of the outline that is linked to the particular topic of the practice question, said sixth computer program code allows the user to transition to other adjacent portions within the outline that pertain to other topics which are not linked to the practice question.

9. A computer readable media as recited in claim 8, wherein said sixth computer program code displays the portion of the outline that is linked to the particular topic of the practice question at the user's request, without first having to display the explanation of the correct answer choice.

10. A computer readable media as recited in claim 8, wherein said computer readable media further comprises:

seventh computer program code for displaying a visual indication of whether the selected answer choice is the correct answer choice, the visual indication being displayed immediately and automatically after the user has selected one of the answer choices and said fourth computer program code has determined whether the answer choice selected by the user is the correct answer choice.

11. A computer readable media as recited in claim 26, wherein said computer readable media further comprises:

seventh computer program code for displaying a visual indication of whether the selected answer choice is the correct answer choice, the visual indication being displayed immediately and automatically after the user has selected one of the answer choices and said fourth computer program code has determined whether the answer choice selected by the user is the correct answer choice.

12. A computer readable media as recited in claim 6, wherein said computer readable media further comprises:

seventh computer program code for displaying a visual indication of whether the selected answer choice is the correct answer choice, the visual indication being displayed immediately and automatically after the user has selected one of the answer choices and said fourth computer program code has determined whether the answer choice selected by the user is the correct answer choice.

13. A computer readable media as recited in claim 12, wherein said computer readable media further comprises:

eighth computer program code for displaying to the user a per-question timing indication for the user to answer the practice question, the timing indication being based on the question timer, and the timing indication being displayed at least while the user is answering the practice question.

14. A computer readable media as recited in claim 6, wherein said computer readable media further comprises:

seventh computer program code for displaying to the user a per-question timing indication for the user to answer the practice question, the timing indication being based on the question timer, and the timing indication being displayed at least while the user is answering the practice question.

15. A computer readable media as recited in claim 14, wherein the per-question timing indication being displayed to the user is an elapsed time that the user has spent answering the question.

16. A computer readable media as recited in claim 14, wherein the per-question timing indication is displayed with reference to a predetermined time.

17. A computer readable media as recited in claim 16, wherein the question timer does not restrict the amount of time the user has to answer the practice question, wherein the predetermined time represents a target performance for the user to answer the practice question, and wherein the per-question timing indication is displayed at least while the user is answering the practice question and enables the user to evaluate their time performance for the practice question with respect to the predetermined time.

18. A computer readable media as recited in claim 6, wherein said computer readable media further comprises:

sixth computer program code for a user to select of a difficulty level for the practice question to be displayed by said first computer program code.

19. A computer readable media as recited in claim 5, wherein said computer readable media further comprises:

sixth computer program code for monitoring a time duration for the user to answer the question, the time duration being based on the question timer; and seventh computer program code for notifying the user when the time duration exceeds a predetermined time.

20. A computer readable media as recited in claim 5, wherein said computer readable media further comprises:

sixth computer program code for displaying to the user a time duration for the user to answer the practice question, the time duration being based on the question timer, and the time duration being displayed at least while the user is answering the practice question; and seventh computer program code for notifying the user when the time duration exceeds a predetermined time.

21. A computer readable media as recited in claim 20, wherein the notifying provided by said seventh computer program code is a visual notification.

22. A computer readable media as recited in claim 20, wherein the notifying provided by said seventh computer program code is an audio notification.

23. A computer readable media as recited in claim 5, wherein said computer readable media further comprises:

sixth computer program code for tracking a user's time and/or correctness performance over a period of time.

24. A computer readable media as recited in claim 23, wherein said computer readable media further comprises:

seventh computer program code for predicting the user's future time and/or correctness performance based on data obtained from the tracking by said sixth computer program code.

25. A computer readable media containing computer instructions that are useful for improving a user's performance on multiple choice examinations, said computer readable media comprising:

first computer program code for displaying a question and a plurality of answer choices on a display screen associated with a computer, the question being associated with a topic;

second computer program code for monitoring a time duration for the user to answer the question;

third computer program code for detecting selection of one of the answer choices by the user;

fourth computer program code for displaying an indication of the time duration;

fifth computer program code for determining whether the selected answer choice is the correct answer choice for the question; and sixth computer program code for displaying on the display screen an appropriate portion of a substantive outline that pertains to the topic of the question without regard to the user's selection of any of the answer choices, the substantive outline containing detailed information on a plurality of topics.

26. A computer readable media as recited in claim 25, wherein the substantive outline is associated with a multiple choice examination for which the user is attempting to improve their performance, and the substantive outline contains at least one subject which includes detailed information on a plurality of topics.

27. A computer readable media as recited in claim 25, wherein said sixth computer program code comprises:

computer program code for identifying the topic of the question;

computer program code for determining the appropriate portion of the outline in accordance with the topic of the question;

computer program code for locating the appropriate portion of the outline to be displayed; and computer program code for displaying the appropriate portion on the display screen.

28. A computer readable media as recited in claim 25, wherein said computer readable media further comprises:

computer program code for monitoring the performance of the user in answering a plurality of questions; and computer program code for predicting future performance of the user based on the monitored performance.

29. A computer readable media as recited in claim 25, wherein said computer readable media further comprises:

computer program code for sequentially providing a plurality of the questions and the answer choices to the user as a question set;

computer program code for monitoring the performance of the user in answering the question set;

computer program code for repeating said sequentially providing and said monitoring for at least another question set; and computer program code for predicting future performance of the user based on the monitored performance for the question sets previously monitored.

30. A computer readable media as recited in claim 25, wherein the appropriate portion of the substantive outline is linked to the topic of the question, and wherein the displaying of the appropriate portion of the substantive outline on the display screen by said sixth computer program code is performed at the user's request.

31. A computer readable media as recited in claim 30, wherein during the displaying of the appropriate portion of the substantive outline, said sixth computer program code operates to allow the user to transition to other adjacent portions within the substantive outline that pertain to other topics.

32. A computer readable media as recited in claim 31, wherein said computer readable media further comprises:

seventh computer program code for displaying a visual indication of whether the selected answer choice is the correct answer choice, the visual indication being displayed immediately and automatically after the user has selected one of the answer choices and said fifth computer program code has determined whether the answer choice selected by the user is the correct answer choice.

33. A computer readable media as recited in claim 30, wherein the appropriate portion of the substantive outline displayed by said sixth computer program code has a visual appearance that strongly resembles that of a corresponding portion of a printed version of the substantive outline available to the user.

34. A computer readable media as recited in claim 30, wherein said computer readable media further comprises:

seventh computer program code for automatically advancing to the next question after the user selects the selected answer choice for the current question.

35. A computer readable media as recited in claim 30, wherein the substantive outline is associated with a multiple choice examination for which the user is attempting to improve their performance, and the substantive outline contains at least one subject which includes detailed information on a plurality of topics, and wherein said computer readable media further comprises:

seventh computer program code for monitoring the user's performance by tracking average time per question and/or percentage correct for each topic; and eighth computer program code for displaying performance information for the user including the average time per question and/or percentage correct for individual topics and/or subjects associated with the questions.

36. A computer readable media as recited in claim 35, wherein the performance information displayed is for a most recent session as well as cumulative of a plurality of sessions.

37. A computer readable media as recited in claim 30, wherein said computer readable media further comprises:

seventh computer program code for automatically displaying an explaination of the correct answer choice for the question after the user has selected one of the answer choices and said fifth computer program code determines whether the selected answer choice is the correct answer choice.

38. A computer readable media as recited in claim 25, wherein said computer readable media further comprises:

seventh computer program code for displaying a visual indication of whether the selected answer choice is the correct answer choice, the visual indication being displayed immediately and automatically after the user has selected one of the answer choices and said fifth computer program code has determined whether the answer choice selected by the user is the correct answer choice.

39. A computer readable media containing computer instructions that are useful for improving a user's performance on a multiple choice examination that covers a plurality of different topics, said computer readable media comprising:

data storage for a plurality practice questions and corresponding answer choices in an electronic format, the practice questions and answers being representative of actual test questions and answers, and each of the practice questions being associated with a topic;

data storage for a substantive outline in an electronic format, the substantive outline providing information on the different topics of the multiple choice examination;

first computer program code for displaying one of the practice questions and the corresponding answer choices for the user;

second computer program code for monitoring the user's selection of one of the answer choices;

third computer program code for determining whether the selected answer choice is the correct answer choice for the question; and fourth computer program code for displaying a portion of the substantive outline at the user's request independent of whether the selected answer choice is correct or incorrect, wherein the appropriate portion of the substantive outline being displayed pertains to the topic of the practice question displayed.

40. A computer readable media as recited in claim 39, wherein the displaying of the appropriate portion of the substantive outline by said fourth computer program code comprises:

computer program code for identifying the topic of the question;

computer program code for determining the appropriate portion of the outline in accordance with the topic of the question;

computer program code for locating the appropriate portion of the outline to be displayed; and computer program code for displaying the appropriate portion on the display screen.

41. A computer readable media as recited in claim 39, wherein the substantive outline contains at least one subject which includes detailed information on a plurality of topics.

42. A computer readable media as recited in claim 39, wherein said computer readable media further comprises:

computer program code for sequentially providing a plurality of the questions and the answer choices to the user as a question set;

computer program code for monitoring the performance of the user in answering the question set of the questions;

computer program code for repeating said sequentially providing and said monitoring for at least another question set; and computer program code for predicting future performance of the user based on the monitored performance for the question sets previously monitored.

43. A computer readable media as recited in claim 39, wherein said computer readable media further comprises:

fifth computer program code for monitoring a time duration for the user to answer the practice question; and sixth computer program code for displaying a visual indication of the time duration.

44. A computer readable media as recited in claim 43, wherein said computer readable media further comprises:

seventh computer program code for displaying a visual indication of whether the selected answer choice is the correct answer choice, the visual indication being displayed immediately and automatically after the user has selected one of the answer choices and said third computer program code has determined whether the answer choice selected by the user is the correct answer choice.

45. A computer readable media as recited in claim 39, wherein during the displaying of the appropriate portion of the substantive outline, said fourth computer program code operates to allow the user to transition to other adjacent portions within the substantive outline that pertain to other topics.

46. A computer readable media as recited in claim 45, wherein said computer readable media further comprises:

fifth computer program code for displaying a visual indication of whether the selected answer choice is the correct answer choice, the visual indication being displayed immediately and automatically after the user has selected one of the answer choices and said third computer program code has determined whether the answer choice selected by the user is the correct answer choice.

47. A computer readable media as recited in claim 46, wherein said computer readable media further comprises:

sixth computer program code for monitoring a time duration for the user to answer the practice question; and seventh computer program code for displaying a visual indication of the time duration.

48. A computer readable media as recited in claim 39, wherein said computer readable media further comprises:

fifth computer program code for displaying a visual indication of whether the selected answer choice is the correct answer choice, the visual indication being displayed immediately and automatically after the user has selected one of the answer choices and said third computer program code has determined whether the answer choice selected by the user is the correct answer choice.

* * * * *

UNITED STATES PATENT AND TRADEMARK OFFICE
CERTIFICATE OF CORRECTION

PATENT NO. : 5,885,087
DATED : March 23, 1999
INVENTOR(S) : Thomas

It is certified that error appears in the above-identified patent and that said Letters Patent is hereby corrected as shown below:

Col. 2, line 43, "can" should be --invention--.

Col. 3, line 21, "principals" should be --principles--.

Col. 10, line 20, "question" to --questions--.

Signed and Sealed this

Twenty-ninth Day of August, 2000

Attest:

Q. TODD DICKINSON

*Attesting Officer*  *Director of Patents and Trademarks*